(12) United States Patent
Hassell

(10) Patent No.: US 11,235,338 B2
(45) Date of Patent: *Feb. 1, 2022

(54) CONTROLLING FLOW OF BLACK POWDER IN HYDROCARBON PIPELINES

(71) Applicant: Saudi Arabian Oil Company, Dhahran (SA)

(72) Inventor: James Clyde Hassell, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/987,131

(22) Filed: Aug. 6, 2020

(65) Prior Publication Data

US 2020/0360933 A1 Nov. 19, 2020

Related U.S. Application Data

(63) Continuation of application No. 15/597,619, filed on May 17, 2017, now Pat. No. 10,744,514, which is a
(Continued)

(51) Int. Cl.
*B01D 45/16* (2006.01)
*B01D 47/06* (2006.01)
(Continued)

(52) U.S. Cl.
CPC ............... *B03C 1/30* (2013.01); *B01D 45/16* (2013.01); *B01D 47/06* (2013.01); *B01D 50/004* (2013.01); *B01D 51/02* (2013.01); *C10L 3/101* (2013.01); *F17D 3/01* (2013.01); *F17D 3/12* (2013.01); *F17D 3/16* (2013.01); *C10L 2290/54* (2013.01); *C10L 2290/545* (2013.01)

(58) Field of Classification Search
CPC ...... B01D 45/16; B01D 47/06; B01D 50/004; B01D 51/02; B03C 1/30; C10L 2290/54; C10L 2290/545; C10L 3/101; F17D 1/088; F17D 1/16; F17D 3/00; F17D 3/01; F17D 3/12; F17D 3/16
See application file for complete search history.

(56) References Cited

U.S. PATENT DOCUMENTS 3,473,661 A 10/1969 Duff
4,070,273 A 1/1978 Morey
(Continued)

FOREIGN PATENT DOCUMENTS

CA 2762034 11/2009
CN 2217468 1/1996
(Continued)

OTHER PUBLICATIONS

Van Beugen, "Black Powder, it's Causes and Cures", Pipeline Technology Conference, published in 2008, 6 pages. (Year: 2008).*
(Continued)

*Primary Examiner* — Cabrena Holecek
(74) *Attorney, Agent, or Firm* — Fish & Richardson P.C.

(57) ABSTRACT

Black powder flowing with hydrocarbons in a hydrocarbon pipeline is converted into a magnetorheological slurry by implementing wet scrubbing in the hydrocarbon pipeline. A flow of the magnetorheological slurry through the hydrocarbon pipeline is controlled.

11 Claims, 4 Drawing Sheets

Related U.S. Application Data continuation of application No. 14/733,674, filed on Jun. 8, 2015, now Pat. No. 9,675,979.

(51) Int. Cl.
| | |
|---|---|
| *B01D 50/00* | (2006.01) |
| *B01D 51/02* | (2006.01) |
| *B03C 1/30* | (2006.01) |
| *C10L 3/10* | (2006.01) |
| *F17D 3/01* | (2006.01) |
| *F17D 3/12* | (2006.01) |
| *F17D 3/16* | (2006.01) |

(56) References Cited

U.S. PATENT DOCUMENTS

| | | | |
|---|---|---|---|
| 4,077,847 A | 3/1978 | Choi | |
| 4,256,468 A | 3/1981 | Mazer | |
| 4,421,520 A | 12/1983 | Matthews | |
| 4,928,635 A | 5/1990 | Shelor | |
| 4,990,059 A | 2/1991 | James | |
| 5,179,903 A | 1/1993 | Abboud | |
| 5,228,524 A | 7/1993 | Johnson | |
| 5,384,111 A | 1/1995 | Tseng | |
| 5,570,469 A | 10/1996 | Soderstrom | |
| 5,757,660 A | 5/1998 | Musow | |
| 6,099,816 A | 8/2000 | College | |
| 6,197,200 B1* | 3/2001 | College | B01D 53/501 |
| | | | 106/775 |
| 7,722,843 B1 | 5/2010 | Srinivasachar | |
| 7,731,863 B2 | 6/2010 | Iyengar et al. | |
| 9,675,979 B2* | 6/2017 | Hassell | B01D 47/06 |
| 10,744,514 B2* | 8/2020 | Hassell | F17D 1/16 |
| 2003/0047440 A1 | 3/2003 | Granite | |
| 2005/0075497 A1 | 4/2005 | Utz | |
| 2005/0242322 A1 | 11/2005 | Ottabiani et al. | |
| 2011/0062371 A1 | 3/2011 | Marur | |
| 2011/0073023 A1 | 3/2011 | Birmingham | |
| 2011/0180750 A1 | 7/2011 | Jaeger | |
| 2011/0290506 A1 | 12/2011 | Ocalan et al. | |
| 2013/0064983 A1 | 3/2013 | Enghardt | |
| 2014/0127107 A1* | 5/2014 | Suchak | B01D 53/60 |
| | | | 423/235 |
| 2015/0202567 A1 | 7/2015 | Suchak | |

FOREIGN PATENT DOCUMENTS

| | | |
|---|---|---|
| CN | 2616297 | 5/2004 |
| CN | 1758947 | 4/2006 |
| CN | 101168464 | 4/2008 |
| CN | 201660474 | 12/2010 |
| JP | 2006136785 | 6/2006 |
| WO | WO 1994010692 | 5/1994 |
| WO | WO 1994010693 | 5/1994 |
| WO | WO 2007038403 | 4/2007 |
| WO | WO 2009137930 | 11/2009 |
| WO | WO 2014094130 | 6/2014 |

OTHER PUBLICATIONS

PCT International Search Report and Written Opinion of the International Searching Authority issued in International Application No. PCT/US2015/061237 dated Mar. 24, 2016; 13 pages.

Chinese Office Action issued in Chinese Application No. 201580081771.0 dated Dec. 25, 2018, 12 pages.

Gulf Cooperation Council Examination Report issued in GCC Application No. GC 2016-31157 dated Jan. 16, 2019, 3 pages.

Gulf Cooperation Council Examination Report issued in GCC Application No. GC 2016-37511 dated Dec. 16, 2019, 3 pages.

Kaiser et al., "Study of Ferromagnetic Liquid," NASA Contractor Report, NASA CR-1407, Aug. 1969, 91 pages.

Natusch and Taylor, "Environmental Effects of Western Coal Combustion: Part IV—Chemical and Physical Characteristics of Coal Fly Ash," EPA, p. iv, Dec. 1980.

Purslow, "Black Powder Removal", http://www.blackpowdersolutions.com/press_comptechtwo.html, retrieved from internet on Mar. 16, 2015, copyright 2015, 5 pages.

Singh et al., "Ferro Fluids: Properties and Applications", International Journal of Research (IJR), vol. 1, Issue 11, Dec. 2014, 4 pages.

Trifilieff et al., "Black Powder Removal from Transmission Pipelines: Diagnostics and Solutions", Jan. 19-21, 2009, 12 pages.

Van Beugen, "Black Powder, it's Causes and Cures", Pipeline Technology Conference, published in 2008, 6 pages.

dictionary.com [online], "Thixotropic definition," available on or before 2021, retrieved from URL <http://www.dictionary.com/browse/thixotropic>, 1 page.

* cited by examiner

CONTROLLING FLOW OF BLACK POWDER IN HYDROCARBON PIPELINES

CROSS-REFERENCE TO RELATED APPLICATIONS

This application is a continuation application of and claims the benefit of priority to U.S. application Ser. No. 15/597,619, filed on May 17, 2017, which is a continuation of U.S. application Ser. No. 14/733,674, filed on Jun. 8, 2015, the contents of which are hereby incorporated by reference.

TECHNICAL FIELD

This specification relates to cleaning hydrocarbon pipelines, for example, in situ hydrocarbon pipelines which are in service.

BACKGROUND

"Black powder" is a term used to describe the appearance of a material that is found in hydrocarbon pipelines (for example, natural gas pipelines) and other pipelines. The material is sometimes wet either from water or liquid hydrocarbons. The solids include a mechanical mixture or chemical combinations of iron sulfides, iron oxides, dirt, sand, salts, chlorides, water, glycols, hydrocarbons, compressor oils, mill scale, or other materials. Black powder can be caused by bacterial and chemical corrosion of a carbon steel pipeline wall. Moisture can act as a catalyst that creates the corrosion resulting in production of iron sulfides and iron oxides in different forms. Black powder sometimes consists of magnetite (iron oxide) and can also include components such as manganese (Mn) and magnesium (Mg).

Black powder is a common problem affecting hydrocarbon pipelines world-wide. Black powder is an extremely hard abrasive material, which can cause erosion of the pipeline wall, seize valves, and damage meters. Black powder can also damage compressors and turbine components. In liquid transmission pipelines, black powder can sometimes cause pump failure.

SUMMARY

This specification describes controlling the flow of black powder in hydrocarbon pipelines.

Some aspects of the subject matter described in this specification can be implemented as a method. Black powder flowing with hydrocarbons in a hydrocarbon pipeline is converted into a magnetorheological slurry by implementing wet scrubbing in the hydrocarbon pipeline. A flow of the magnetorheological slurry through the hydrocarbon pipeline is controlled.

This, and other aspects, can include one or more of the following features. To implement a wet scrubbing, the black powder can be coalesced into the magnetorheological slurry by mixing a quantity of a carrier fluid and a quantity of a thixotropic agent with the hydrocarbons in the hydrocarbon pipeline. The magnetorheological slurry includes the carrier fluid, the thixotropic agent, and the black powder. To coalesce the black powder into the magnetorheological slurry, a quantity of surfactants can be mixed with the quantity of the carrier fluid and the quantity of the thixotropic agent. The quantity of the carrier fluid and the quantity of the thixotropic agent can be mixed with the hydrocarbons in the hydrocarbon pipeline using a turbulence of the hydrocarbons flowing in the hydrocarbon pipeline. The flow of the magnetorheological slurry through the hydrocarbon pipeline can be controlled by removing the magnetorheological slurry from the hydrocarbon pipeline. The carrier fluid and the thixotropic agent can be separated from the magnetorheological slurry, for example, after removing the magnetorheological slurry from the hydrocarbon pipeline. To control the flow of the magnetorheological slurry through the hydrocarbon pipeline, the hydrocarbons and the magnetorheological slurry can be rotationally flowed through a vortex chamber connected to the hydrocarbon pipeline. The rotational flowing can separate the hydrocarbons and the magnetorheological slurry. The separated hydrocarbons can be flowed through a first outlet of the vortex chamber in the hydrocarbon pipeline. The separated magnetorheological slurry can be flowed through a second outlet of the vortex chamber. The black powder can include magnetic particles. A magnetic field can be applied to the magnetorheological slurry to control the flow of the magnetorheological slurry through the hydrocarbon pipeline. The magnetic field can be generated by at least one of a permanent magnet, an electromagnet, or a series of variable magnetic inductance coils. The black powder can include non-magnetic particles which are coalesced with the magnetic particles in the magnetorheological slurry. The hydrocarbons can include hydrocarbon gas. The black powder can include micrometer-sized particles.

Some aspects of the subject matter described here are implemented as a system that includes a wet scrubber system and a flow controller. The wet scrubber system is configured to be connected to a hydrocarbon pipeline flowing hydrocarbons and black powder. The wet scrubber system is configured to convert black powder flowing with hydrocarbons in the hydrocarbon pipeline into a magnetorheological slurry by implementing a wet scrubbing in the hydrocarbon pipeline. The flow controller is configured to be connected to the hydrocarbon pipeline and to control a flow of the magnetorheological slurry through the hydrocarbon pipeline.

This, and other aspects, can include one or more of the following features. The flow controller can be configured to control the quantity of the carrier fluid and the quantity of the thixotropic agent to be flowed into the hydrocarbon pipeline. The quantity of the carrier fluid and the quantity of the thixotropic agent can be mixed with the hydrocarbons in the hydrocarbon pipeline utilizing a turbulence of the hydrocarbons flowing in the hydrocarbon pipeline. A vortex chamber can be configured to receive the hydrocarbons and the magnetorheological slurry. The vortex chamber can be configured to be connected to the hydrocarbon pipeline to rotationally flow the hydrocarbons through the vortex chamber. The rotational flowing can separate the hydrocarbons from the magnetorheological slurry. The vortex chamber can include a first outlet through which the separated hydrocarbons are flowed into the hydrocarbon pipeline and a second outlet through which the separated magnetorheological slurry is flowed. The black powder can include magnetic particles. The flow controller can include a magnetic flow controller configured to apply a magnetic field to the magnetorheological slurry. The magnetic flow controller can include at least one of a permanent magnet, an electromagnet, or a series of variable magnetic inductance coils.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
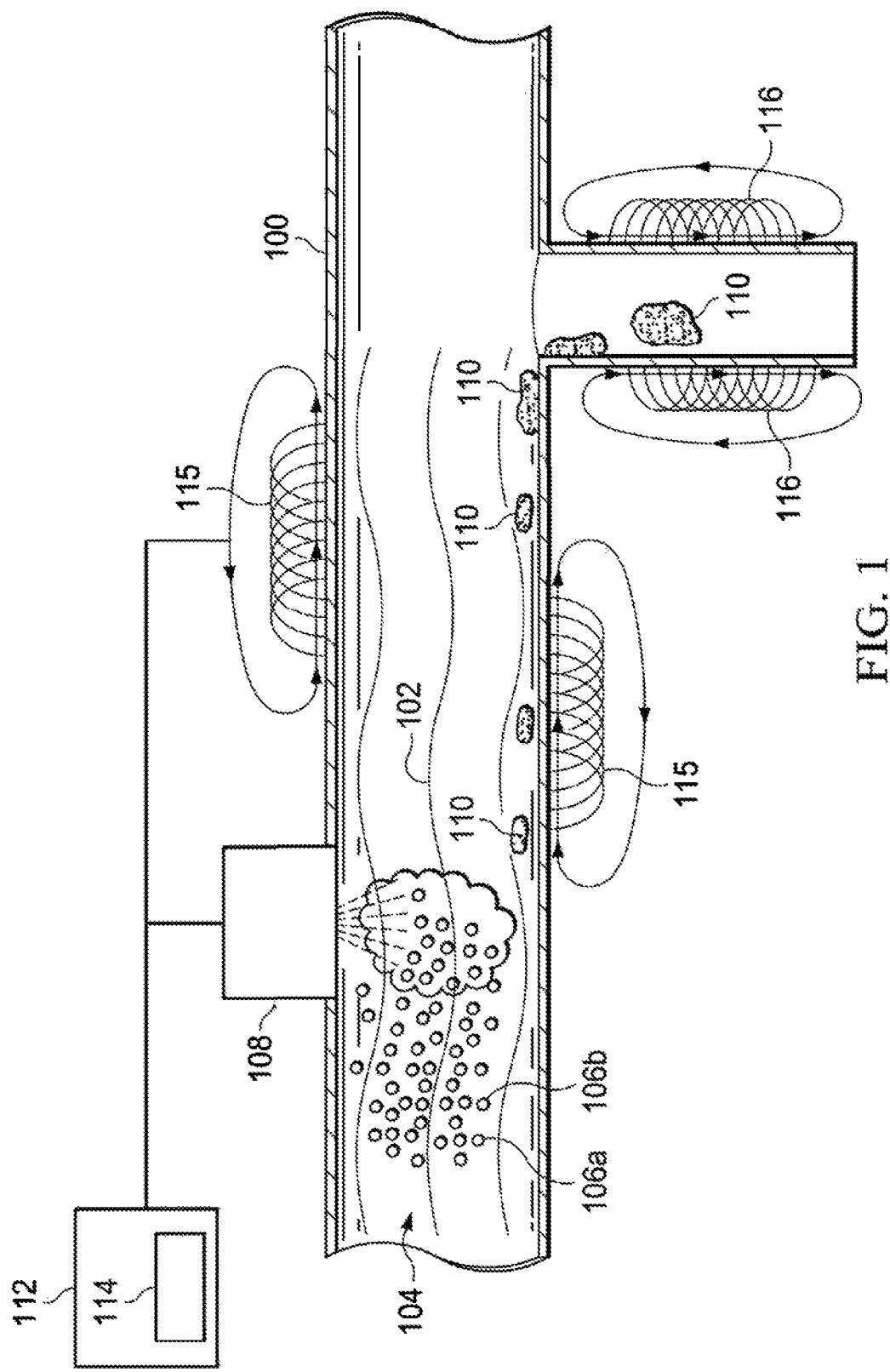
FIG. 1 is a schematic diagram of an example of a system for controlling a flow of black powder in a hydrocarbon pipeline.

This specification describes controlling flow of black powder in hydrocarbon pipelines. For example, the subject matter described here can be implemented to remove black powder from hydrocarbon pipelines in situ, that is, from hydrocarbon pipelines in the field that are in service and that are actively transporting hydrocarbons such as hydrocarbon gas. One technique to clean pipelines by removing black powder is to filter the black powder at entrances of processing plants or networks. However, the physical characteristics of black powder work against standard filtration. The particles in black powder can shear easily at sub-micrometer sizes, allowing them to pass through gas separation devices and filters configured to trap particles in the sub-micrometer size range. Consequently, filtration of black powder in flowing gas streams requires extra effort. In some instances, operators replace or clean filter elements at optimum points shown by pressure differentials across the filters to minimize flow resistance, powder penetration, or overfill. Filtering can also involve expensive reinforced filter elements to prevent the filter from collapsing under the weight of the powder during gas flow.

Another technique to clean pipelines is to use water-based or hydrocarbon-based gels created by adding a gelling agent to a base liquid to achieve higher viscosity of the liquid batch. Gels can be used in pipeline cleaning operations to keep particles floating (in suspension). Doing so can enhance the displacement capabilities of liquids. Due to the high viscosity, however, the gels may leave residue in the pipeline after cleaning. A gel breaker may be needed to remove the residue. Pipelines in service may, consequently, need large amounts of gel, making the application of gels problematic. In addition, gels have lower wetting capability compared to other liquids due to changed surface tension properties.

A further technique to clean pipelines is by chemical dissolution. However, chemical dissolution may not be viable to clean pipelines in service because the chemical reactions require long contact times, which is difficult to achieve while the cleaning pipelines are in service. One option of chemical dissolution of black powder involves using chelants, which have shown good results on iron sulfide under laboratory experiments. However, large amounts of liquids are needed for applications in pipelines. Moreover, chelants are water-based and can corrode the pipelines, thereby becoming a part of the problem instead of the solution even when adding corrosion inhibitors.

This specification describes a technique to trap and to remove black powder flowing through a hydrocarbon pipeline. Black powder includes several forms of strongly magnetic material including mill scale, magnetite ($Fe_3O_4$), and greigite ($Fe_3S_4$). Black powder also includes non-magnetic materials. Industry literature reports that black powder forms can range from weakly magnetic to strongly magnetic in nature. This specification describes techniques to convert black powder flowing with hydrocarbons (for example, hydrocarbon gas) in a hydrocarbon pipeline to a carrier fluid using thixotropic agents, thereby creating a magnetorheological slurry. A magnetorheological fluid is a fluid that changes the way it flows in the presence of a magnetic field and becomes directable by applying a magnetic field to control a flow of the magnetorheological fluid away from (for example, out of) the hydrocarbon pipeline. These magnetorheological fluids can be in the form of liquid and aerosolized phases traveling in the hydrocarbon stream.

The subject matter described here can be implemented in the technological fields of natural gas processing, pipeline transportation, and natural gas measurement and operations, to name a few. By implementing the techniques described here, a concentration of black powder in a hydrocarbon pipeline can be decreased or eliminated. Consequently, the harmful effects of black powder on the hydrocarbon pipeline can be negated. In this manner, the techniques described here can be implemented to solve a chronic hydrocarbon pipeline industry problem. In addition, the black powder that is removed from the hydrocarbon pipeline can be recovered, processed, and used as ferrofluids.

Ferrofluids find applications in several industries. Ferrofluids are often used as rotating shaft seals in magnetic tapes, magneto-optical drives, ad rigid, and floppy disks. Ferrofluids are also used in audio loudspeakers to produce improved quality and higher manufacturing yields. Ferrofluids also find application in the biomedical field as polymer microspheres that can be coated with antibodies or therapeutic/chemotherapy drugs. Ferrofluids are also used in sensors, switches, and solenoids to improve performance in applications that use inclinometers, accelerometers, flow meters, pressure and level sensors, and various switches. Ferrofluids are also used in electrical transformers to improve cooling by enhancing fluid circulation within transformer windings.

Such fluids are specialty products whose production incurs high manufacturing costs. Magnetic black powder, on the other hand, is automatically generated in the hydrocarbon pipeline. Thus, using the black powder recovered by implementing the techniques described here and processed to uniform particle sizes for use as ferrofluids in processes of other industries can decrease the costs associated with the processes of the other industries.

FIG. 1 is a schematic diagram of an example of a system for controlling a flow of black powder in a hydrocarbon pipeline 100. The hydrocarbon pipeline 100 can be an in situ pipeline in service. That is, the hydrocarbon pipeline 100 can be operational to transport hydrocarbons 102 between locations. The hydrocarbons 102 can include hydrocarbon gas. In some instances, the hydrocarbons 102 can contain aerosolized aqueous or hydrocarbon liquids traveling in the pipeline 100 or separated aqueous/hydrocarbon liquids traveling along walls of the pipeline 100. Black powder 104 is disbursed throughout and can flow with the hydrocarbons 102. The black powder 104 includes magnetic particles (for example, magnetic particles 106a) and non-magnetic particles (for example, non-magnetic particles 106b), as described above. The particles in the black powder 104 can have sizes in the range of substantially one micrometer or less and can be dispersed in the hydrocarbon stream gas phase and liquid phases as solid particles. In general, the black powder 104 is small enough to be easily dispersed in the hydrocarbons 102.

The system can include a wet scrubber system 108 configured to be connected to the hydrocarbon pipeline 100. The wet scrubber system 100 can be configured to convert the black powder 104 into a magnetorheological slurry 110 by binding black powder particles via a carrier liquid and thixotropic media. The magnetorheological slurry 110 can contain black powder 104 entrained from the wet scrubbing process which includes magnetic particles 106a, non-magnetic particles 106b, and carrier and thixotropic liquids (described below). The wet scrubbing process serves to provide a preliminary removal process and serves as a distribution mechanism for binding the magnetic and non-magnetic particles by the liquid media. This binding process allows additional mass for inertial removal for non-magnetic particles 106b from the gas stream and also allows an increased separation effect for magnetic particles 106a when a magnetic field is created from induction coils 115 located along the pipeline surface. Movement of the magnetorheological slurry 110 can be managed through a system controlling the timing and strength of the magnetic flux created by the induction coils 115. Even small quantities of magnetic particles distributed through the magnetorheological slurry 110 can allow control of flow of the non-magnetic particles 106b, now part of the magnetorheological slurry 110 along the pipeline walls through additional magnetic induction coils 116, out of the pipeline system 114.

The system also includes a flow controller 112 configured to be connected to the hydrocarbon pipeline 100. The flow controller 112 is configured to control the fluid distribution of the wet scrubbing process. In some implementations, the wet scrubber system 108 can include multiple storage tanks (described below), each storing a component to be mixed with the black powder 104 inside the hydrocarbon pipeline 100 to convert the black powder 104 into the magnetorheological slurry 110. The flow controller 112 can be connected to the wet scrubber system 108 to control a quantity of each component to be flowed into the hydrocarbon pipeline 100 and to flow the quantity into the hydrocarbon pipeline 100.

The flow controller 112 can be implemented as hardware, software, firmware, or combinations of them. In some implementations, the flow controller 112 can include a computer system including one or more processors and a computer-readable medium storing instructions executable by the one or more processors to perform operations. In addition, the flow controller 112 can include one or more pumps, one or more valves or other flow control equipment (or combinations of them) connected to the computer system. The operations that the flow controller 112 can perform can include, for example, identifying a quantity of a component (such as a carrier fluid, a thixotropic agent, or other component), and operating the one or more pumps, the one or more valves, or other flow control equipment to pump the identified quantity into the hydrocarbon pipeline 100.

As described above, the magnetorheological slurry 110 can be weakly magnetic, strongly magnetic, or somewhere in between. In some implementations, the magnetic flow controller 114 can be configured to coordinate timing and strength of the magnetic field created by the induction coils 115 or 116 to control a flow of the magnetorheological slurry 110, for example, away from the hydrocarbon pipeline 100. Some implementations of the wet scrubber system and the flow controller will be described below with reference to FIGS. 2 and 3.

Figure 2:
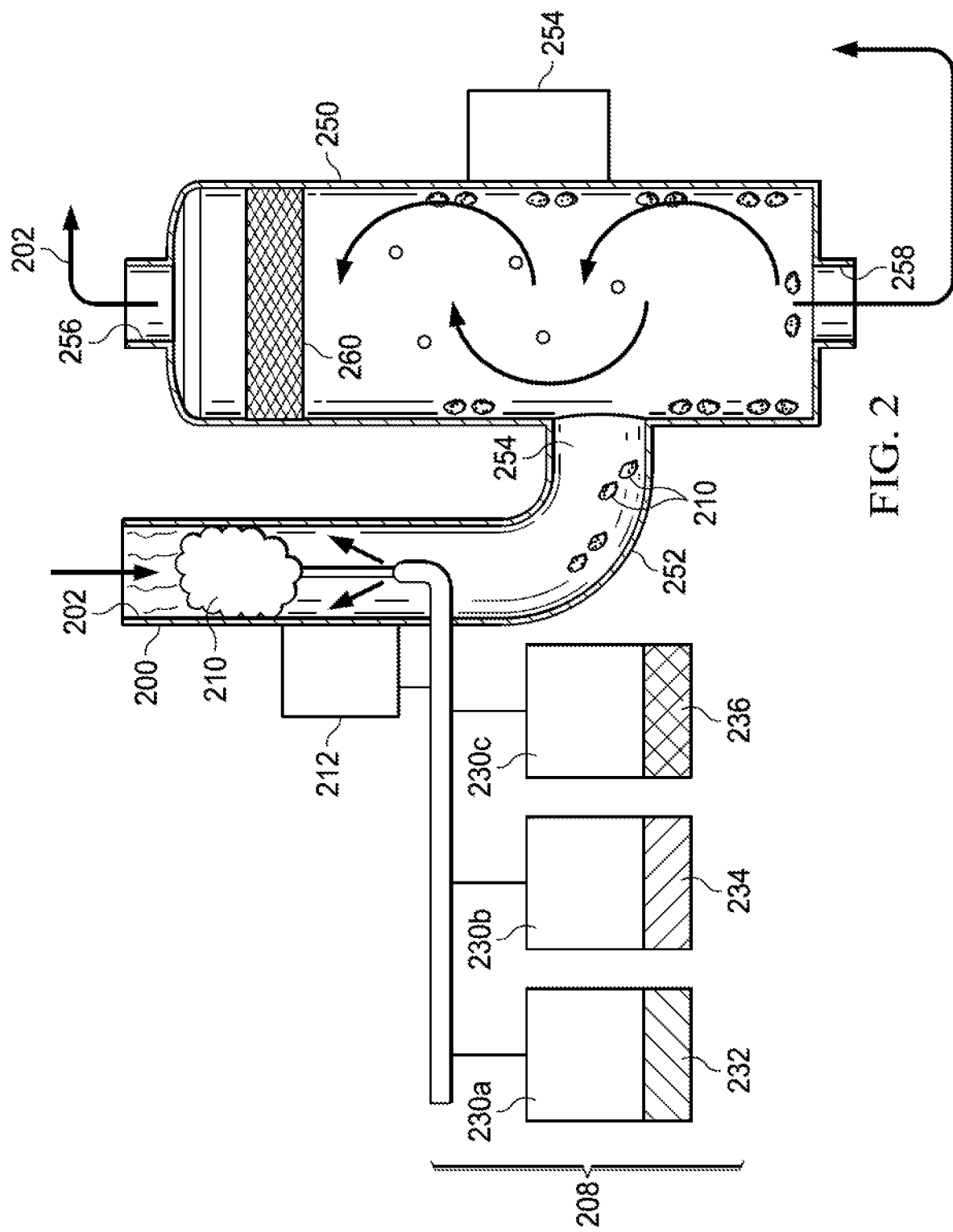
FIG. 2 is a schematic diagram of an example of a first implementation of a system for controlling the flow of black powder in a hydrocarbon pipeline.

FIG. 2 is a schematic diagram of an example of a first implementation of a system for controlling the flow of black powder 204 in a hydrocarbon pipeline 200 flowing hydrocarbons 202, for example, hydrocarbon gas. The hydrocarbon pipeline 200 is an in situ pipeline in service, that is, the pipeline 200 is implemented in the field and is transporting the hydrocarbons between locations. The wet scrubber system 208 can include multiple storage tanks. For example, the storage tanks can include a carrier fluid storage tank 230a configured to store a carrier fluid 232 and to be connected to the hydrocarbon pipeline 200. The storage tanks can include a thixotropic agent storage tank 230b configured to store a thixotropic agent 234 and to be connected to the hydrocarbon pipeline 200.

The system can include a flow controller 212 configured to be connected to the hydrocarbon pipeline 200 and to the wet scrubber system 208. The flow controller 212 can be substantially similar to the flow controller 112 described above. In some implementations, the flow controller 212 can be configured to control the quantity of the carrier fluid 232 and the quantity of the thixotropic agent 234 flowed from the carrier fluid storage tank 230a and the thixotropic agent storage tank 230b, respectively, into the hydrocarbon pipeline 200.

In some implementations, the storage tanks can include a surfactant storage tank 230c configured to store surfactants 236 and to be connected to the hydrocarbon pipeline 200. Surfactants (sometimes called surface active agents) can be added to a batch of liquids, for example, hydrocarbon-based or water-based liquids, to create an efficient and time-effective cleaning solution. Instead of attempting to dissolve contaminants or trying to keep contaminants in solution, surfactants will penetrate contaminants and break them up into pieces in a short time (for example, a reaction time as low as one minute). In this disclosure, surfactants serve as dispersion agents for magnetic particles in the carrier liquid that allow a stabilized magnetized colloidal suspension which can be displaced out of the hydrocarbon pipeline 200. The surfactants also serve as an enhanced scrubbing media by ensuring maximum contact area is available for black powder coating. The use of surfactants also significantly reduces the amount of carrier fluids required for the system and reduces the amount of free liquid to be removed. The flow controller 212 can be configured to control the quantity of the surfactants 236 flowed from the surfactant storage tank 230c into the hydrocarbon pipeline 200.

In operation, the flow controller 212 can cause the wet scrubber system 208 to implement a wet scrubbing to convert the black powder 204 into a magnetorheological slurry 210. To do so, the flow controller 212 can cause the wet scrubber system 208 to flow the quantity of the carrier fluid 232 and the quantity of the thixotropic agent 234 (and, in some implementations, the quantity of the surfactants 236) into the hydrocarbon pipeline 200. The wet scrubber system 208 or the flow controller 212 can include tubing that is connected to the storage tanks and inserted into the hydrocarbon pipeline 200. An end of the tubing inserted into the hydrocarbon pipeline 200 can face the oncoming stream of hydrocarbons 202 and black powder 204.

When the quantity of the carrier fluid 232 and the quantity of the thixotropic agent 234 (and, in some implementations, the quantity of the surfactants 236) are flowed into the hydrocarbon pipeline 200, the components mix with the black powder 204 under the turbulence of the hydrocarbons 202 flowing in the hydrocarbon pipeline 200 resulting in the magnetorheological slurry 210. In this manner, the black powder 204 in the hydrocarbon pipeline 200 is converted into the magnetorheological slurry 210.

To remove the magnetorheological slurry 210 from the hydrocarbon pipeline 200, the system can include a vortex chamber 250 configured to receive the hydrocarbons 202 and the magnetorheological slurry 210. The vortex chamber 250 can be connected to the hydrocarbon pipeline 200 in such a manner that a rotational flow is induced in the hydrocarbons 202 and the magnetorheological slurry 210 as the two fluids flow through the vortex chamber 250. Such a rotational flow can be induced by an arrangement of the vortex chamber 250 relative to the hydrocarbon pipeline 200. The vortex chamber 250 can be connected in series with or in parallel with the hydrocarbon pipeline 200.

In some implementations, a bend 252 can be introduced in the hydrocarbon pipeline 200 downstream of the location at which the black powder 204 is converted into the magnetorheological slurry 210. The vortex chamber 250 can have a cylindrical cross-section. The vortex chamber 250 can include an inlet 254 formed at an outer circumference of the vortex chamber 250 and offset from a longitudinal axis of the vortex chamber 250. The hydrocarbon pipeline 200 at the bend 252 can be connected to the inlet 254 such that the hydrocarbons 202 and the magnetorheological slurry 210 flow almost tangentially to an inner surface of the vortex chamber 250, thereby rotating as the hydrocarbons 202 and the magnetorheological slurry 210 flow through the vortex chamber 250.

Because the hydrocarbons 202 and the magnetorheological slurry 210 are in two different phases, as a preliminary separation, the rotational flow can create a centrifugation action forcing the magnetorheological slurry 210 to the inner walls of the vortex chamber 250 while the hydrocarbons 202, which are relatively unaffected by the centrifugation action, remain nearer to the center of the vortex chamber 250. In this manner, the hydrocarbons 202 and the magnetorheological slurry 210 can be separated. The vortex chamber 250 can include a first outlet 256 through which the separated hydrocarbons can be flowed into another section of the hydrocarbon pipeline (not shown). The vortex chamber 250 can include a second outlet 258 through which the separated magnetorheological slurry 210 can be flowed, as described below.

In some implementations, the system can include a magnetic flow controller 214 connected to the vortex chamber 250 (for example, to an outer circumference of the vortex chamber 250) to separate the magnetorheological slurry 210 from the hydrocarbons 202. The magnetic flow controller 214 can be implemented as at least one of a permanent magnet, an electromagnet, a series of variable magnetic inductance coils, or a combination of them. The magnetic flow controller 214 can be configured to generate a variable magnetic field that can be controlled using the flow controller 212. By applying the magnetic field (for example, magnetic induction), the magnetic magnetorheological slurry 210 can be moved along the inner side walls of the vortex chamber 250 towards the second outlet 258 through which the separated magnetorheological slurry 210 can be flowed.

In some implementations, the vortex chamber 250 can include a filter 260 (for example, an electrostatic screen). The filter 260 can be placed near the first outlet 256 and can be configured to capture any aerosolized magnetorheological slurry 210 that did not get separated in the vortex chamber 250.

In some implementations, multiple systems such as those described above with reference to FIG. 2 can be connected at corresponding multiple locations along the hydrocarbon pipeline 200. Black powder flow control and separation can be implemented using one or more of the multiple systems. In such implementations, a maintenance, repair, or replacement of at least one of the systems can be performed while at least another of the systems simultaneously separates the black powder 204 from the hydrocarbons 202 in the hydrocarbon pipeline 200.

Figure 3:
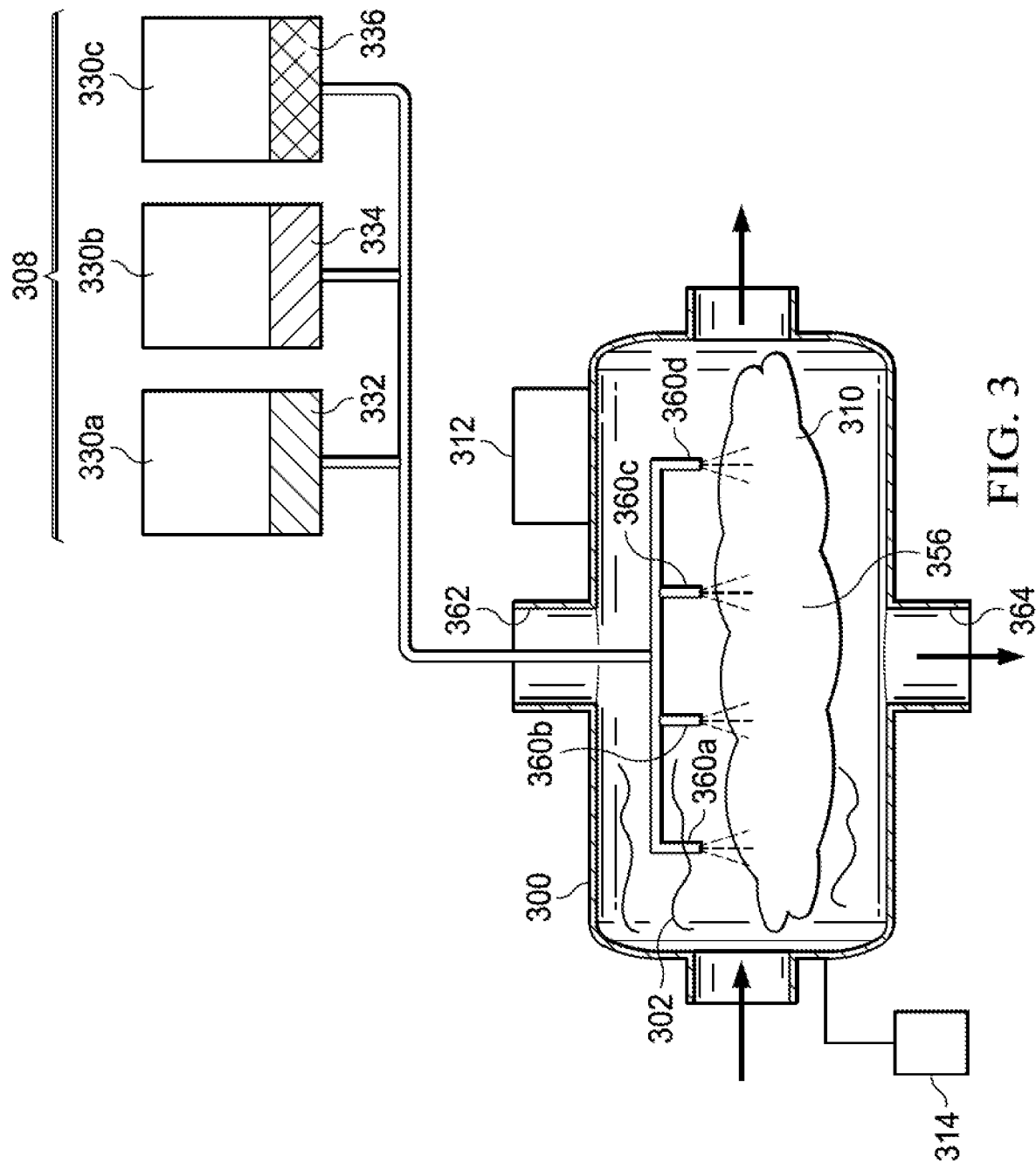
FIG. 3 is a schematic diagram of an example of a second implementation of a system for controlling the flow of black powder in a hydrocarbon pipeline.

FIG. 3 is a schematic diagram of an example of a second implementation of a system for controlling the flow of black powder 304 in a hydrocarbon pipeline 300. The hydrocarbon pipeline 300 is in situ, that is, the pipeline is implemented in the field and is in service to transport the hydrocarbons between locations. The wet scrubber system 308 can include multiple storage tanks. For example, the storage tanks can include a carrier fluid storage tank 330a configured to store a carrier fluid 332 and to be connected to the hydrocarbon pipeline 300. The storage tanks can include a thixotropic agent storage tank 330b configured to store a thixotropic agent 234 and to be connected to the hydrocarbon pipeline 300.

The system can include a flow controller 312 configured to be connected to the hydrocarbon pipeline 300 and to the wet scrubber system 308. The flow controller 312 can be substantially similar to the flow controller 112 described above. In some implementations, the flow controller 312 can be configured to control the quantity of the carrier fluid 332 and the quantity of the thixotropic agent 334 flowed from the carrier fluid storage tank 330a and the thixotropic agent storage tank 330b, respectively, into the hydrocarbon pipeline 300. In some implementations, the storage tanks can include a surfactant storage tank 330c configured to store surfactants 336 and to be connected to the hydrocarbon pipeline 300. The flow controller 312 can be configured to control the quantity of the surfactants 336 flowed from the surfactant storage tank 330c into the hydrocarbon pipeline 300.

In operation, the flow controller 312 can cause the wet scrubber system 308 to implement a wet scrubbing to convert the black powder 304 into a magnetorheological slurry 310. To do so, the flow controller 312 can cause the wet scrubber system 308 to flow the quantity of the carrier fluid 332 and the quantity of the thixotropic agent 334 (and, in some implementations, the quantity of the surfactants 336) into the hydrocarbon pipeline 300. The wet scrubber system 308 or the flow controller 312 can include tubing that is connected to the storage tanks and inserted into the hydrocarbon pipeline 300 through an inlet 362. An end of the tubing inserted into the hydrocarbon pipeline 300 can be connected to multiple sprayers (for example, a first sprayer 360a, a second sprayer 360b, a third sprayer 360c, a fourth sprayer 360c, and more or fewer sprayers), that can spray the components received from the storage tanks onto the hydrocarbons 300 and the black powder 304 to create a foam zone 356.

When the quantity of the carrier fluid 332 and the quantity of the thixotropic agent 334 (and, in some implementations, the quantity of the surfactants 336) are sprayed on to the hydrocarbons 302 and the black powder 304 in the hydrocarbon pipeline 300, the components mix with the black powder 304 under the turbulence of the hydrocarbons 302 flowing in the hydrocarbon pipeline 300 and under the turbulence created by the sprayers. Such mixing results in the magnetorheological slurry 310 being formed in the foam zone 356. In this manner, the black powder 304 in the hydrocarbon pipeline 300 is converted into the magnetorheological slurry 310.

In some implementations, the system can include a magnetic flow controller 314 connected to the hydrocarbon pipeline 300 to separate the magnetorheological slurry 310 from the hydrocarbons 302. The magnetic flow controller 314 can be implemented as at least one of a permanent magnet, an electromagnet, a series of variable magnetic inductance coils, or a combination of them. The magnetic flow controller 314 can be configured to generate a variable magnetic field that can be controlled using the flow controller 312

In use, an outlet 364 can be formed in the hydrocarbon pipeline 300 to collect the magnetorheological slurry 310 formed in the foam zone 356. In some implementations, the inlet 362 and the outlet 364 can be formed on a circumferential surface of the hydrocarbon pipeline 300 at diametrically opposite locations. In some implementations, the outlet 364 can be formed at any location on the circumferential surface downstream of the inlet 362. The magnetic flow controller 314 can be connected to the hydrocarbon pipeline 300 around the outlet 364 and can apply a magnetic field to remove the magnetorheological slurry 310 out of the hydrocarbon pipeline 300 through the outlet 364. For example, by applying the magnetic field (for example, magnetic induction), the magnetic magnetorheological slurry 310 can be attracted toward the outlet 364. Alternatively or in addition, the magnetorheological slurry 310 can be moved along the inner side walls of the hydrocarbon pipeline 300 near the outlet 364 and directed towards the outlet 364

In some implementations, multiple systems such as those described above with reference to FIG. 3 can be connected at corresponding multiple locations along the hydrocarbon pipeline 300. Black powder flow control and separation can be implemented using one or more of the multiple systems. In such implementations, a maintenance, repair, or replacement of at least one of the systems can be performed while at least another of the systems simultaneously separates the black powder 304 from the hydrocarbons 302 in the hydrocarbon pipeline 300. Also, in some implementations, some systems such as those described above with reference to FIG. 2 can be used in combination with systems such as those described above with reference to FIG. 3.

Figure 4:
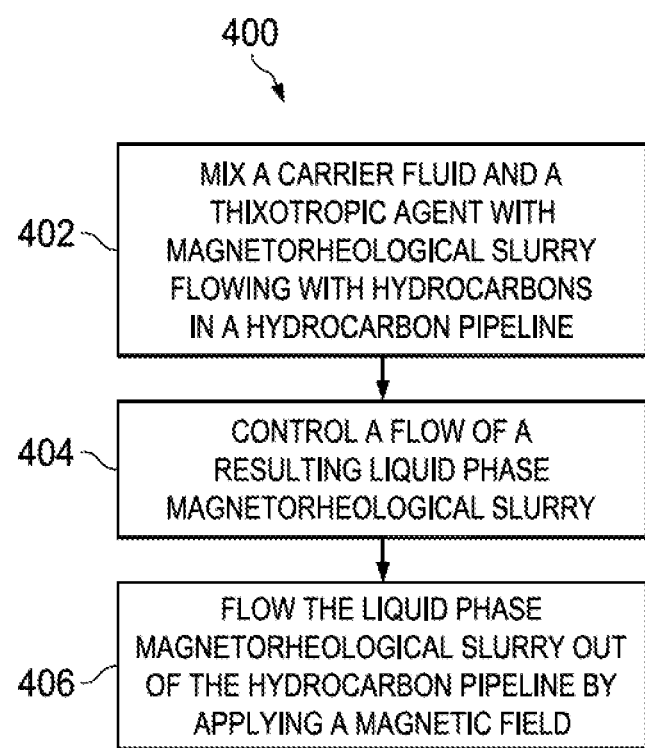
FIG. 4 is a flowchart of an example of a process for controlling the flow of black powder in a hydrocarbon pipeline.

FIG. 4 is a flowchart of an example of a process 400 for controlling the flow of black powder in a hydrocarbon pipeline. The hydrocarbon pipeline can be an in situ pipeline in service. At 402, a carrier fluid and a thixotropic agent (and, in some implementations, a surfactant) can be mixed with black powder flowing with hydrocarbons in the hydrocarbon pipeline. At 404, a flow of a resulting magnetorheological slurry can be controlled. At 406, the magnetorheological slurry can be flowed out of the hydrocarbon pipeline by applying a magnetic field.

In the implementations described here, the components introduced into the hydrocarbon pipeline to convert the black powder into the magnetorheological slurry (for example, the carrier fluid, the thixotropic agent, the surfactant) can be removed from the hydrocarbon pipeline with the black powder. The black powder can then be separated from the components. To do so, in some implementations, a settlement tank with an inductance plate can be used. The separated components can then be recirculated to the respective storage tanks for re-use. The black powder can be collected, processed, and used, for example, in applications that use micron or sub-micron sized magnetic particles. In such instances, the magnetic and non-magnetic particles can be separated before using the magnetic particles, for example, as ferrofluids.

Thus, particular implementations of the subject matter have been described. Other implementations are within the scope of the following claims.

The invention claimed is:

1. A method comprising:
converting black powder flowing with hydrocarbons in a hydrocarbon pipeline into a magnetorheological slurry by implementing wet scrubbing in the hydrocarbon pipeline;
rotationally flowing the hydrocarbons and the magnetorheological slurry causing the hydrocarbons to separate from the magnetorheological slurry resulting in a separated hydrocarbons and a separated magnetorheological slurry;
flowing the separated hydrocarbons through the hydrocarbon pipeline; and
flowing the separated magnetorheological slurry out of the hydrocarbon pipeline.

2. The method of claim 1, wherein rotationally flowing the hydrocarbons and the magnetorheological slurry comprises rotationally flowing the hydrocarbons and the magnetorheological slurry through a vortex chamber connected to the hydrocarbon pipeline.

3. The method of claim 1, wherein the black powder comprises magnetic particles, and wherein the method further comprises controlling a flow of the magnetorheological slurry through the hydrocarbon pipeline by applying a magnetic field to the magnetorheological slurry.

4. The method of claim 1, wherein the hydrocarbons comprise hydrocarbon gas.

5. The method of claim 1, wherein the black powder comprise micrometer-sized particles.

6. The method of claim 1, wherein the magnetic field is generated by at least one of a permanent magnet, an electromagnet, or a series of variable magnetic inductance coils.

7. The method of claim 6, wherein the black powder comprises non-magnetic particles which are coalesced with the magnetic particles in the magnetorheological slurry.

8. The method of claim 1, wherein implementing wet scrubbing comprises coalescing the black powder into the magnetorheological slurry by mixing a quantity of a carrier fluid and a quantity of a thixotropic agent with the hydrocarbons in the hydrocarbon pipeline, wherein the magnetorheological slurry comprises the carrier fluid, the thixotropic agent, and the black powder.

9. The method of claim 8, wherein coalescing the black powder into the magnetorheological slurry further comprises mixing a quantity of surfactants with the quantity of the carrier fluid and the quantity of the thixotropic agent.

10. The method of claim 8, wherein the quantity of the carrier fluid and the quantity of the thixotropic agent are mixed with the hydrocarbons in the hydrocarbon pipeline utilizing a turbulence of the hydrocarbons flowing in the hydrocarbon pipeline.

11. The method of claim 8, further comprising separating the carrier fluid and the thixotropic agent from the magnetorheological slurry.

* * * * *